US006658789B2

(12) United States Patent
Klayman

(10) Patent No.: US 6,658,789 B2
(45) Date of Patent: *Dec. 9, 2003

(54) PLANT PROTECTION

(76) Inventor: Avi Klayman, Eliyahu Hakim Street 9, Tel Aviv (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,811
(22) PCT Filed: Dec. 25, 1997
(86) PCT No.: PCT/IL97/00432
§ 371 (c)(1), (2), (4) Date: Aug. 17, 1999
(87) PCT Pub. No.: WO98/28966
PCT Pub. Date: Jul. 9, 1998

(65) Prior Publication Data
US 2002/0020110 A1 Feb. 21, 2002

(30) Foreign Application Priority Data
Dec. 26, 1996 (IL) .................................................. 119919

(51) Int. Cl.⁷ ............................................... A47G 7/08
(52) U.S. Cl. ...................................................... 47/31
(58) Field of Search ....................... 47/31, 28.1; 52/63; 135/93; 523/135

(56) References Cited

U.S. PATENT DOCUMENTS

| | | | |
|---|---|---|---|
| 2,051,643 A | | 8/1936 | Morrison |
| 4,730,633 A | * | 3/1988 | Greenbaum ................. 135/93 |
| 4,895,904 A | | 1/1990 | Allingham |
| 5,083,396 A | * | 1/1992 | Traut ........................ 47/28.1 |
| 5,097,624 A | | 3/1992 | Klayman et al. |
| 5,198,287 A | * | 3/1993 | Samson et al. ............... 442/79 |
| 5,519,965 A | | 5/1996 | Robinson |
| 5,555,681 A | * | 9/1996 | Cawthon ....................... 52/63 |
| 5,605,007 A | | 2/1997 | Hinsperger |
| 6,164,361 A | * | 12/2000 | Meyer ........................ 160/12 |

FOREIGN PATENT DOCUMENTS

| | | | | |
|---|---|---|---|---|
| DE | 19710079 A1 | * | 9/1998 | ............. B26F/1/18 |
| GB | 2098247 | | 11/1982 | |
| GB | 2161194 A | * | 1/1986 | ............. E06B/9/52 |
| JP | 930232325 | | 8/1993 | |
| JP | 940053531 | | 3/1994 | |
| NL | EP-0811317 A2 | * | 10/1997 | ................. 47/28.1 |

OTHER PUBLICATIONS

CleoSci; Product Info: Ultra V 99 Program; Copyright 1996; http://www.cleosci.com/ultrav/uv–inhlp.htm.*
Green–Tek: Insect Screens Anti–Virus and No–Thrips; "Screen Out" These Pesticide Headaches: www.green–tek.com.*
CleoSci: Ultra V Program; UV Absorbers What and Why: http://www.cleosci.com/ultrav/uv–inhlp.htm.*
Ciba Specialty Chemicals—Fibers & Textiles Industry: Light Stability: www.cibasc.com/fibers and textiles.*
The Rossel–screenhouse: Advertisement from Clovis Lande Horticultural Supplier; http://www.clovis.co.uk/virology.htm.*
A New & Economical "Screenhouse" For Virus Research In Tropical Areas: H.W. Rossel; Food & Agricultural Organization (FAO) Plant Protection Bulletin, 1979, v. 27(3), p. 74–76.*
Screenhouse Breaks New Ground In Protected Cultivation: H.W. Rossel; vol. 4, No. 5 Asian Agribusiness, 1980's.*
McConkey CO. 1998 Horticultural Supply Catalog; pp. 86–87.*
Gintec Shade Technologies, Inc.; Insect Screens: http://www.gintec–shade.com/insect–screen.html.*
GreenTek; Insect Screens [Anti–Virus & No–Thrips]: http://wwwgreen–tek.com.*

* cited by examiner

*Primary Examiner*—Michael J. Carone
*Assistant Examiner*—Francis T. Palo
(74) *Attorney, Agent, or Firm*—Lowe Hauptman Gilman & Berner LLP

(57) ABSTRACT

Improved protection of plants and their crops is achieved by growing the plant under a construction having a roof with at least a substantial portion being made of a net of a mesh size allowing adequate ventilation. The net is made of a transparent or translucent polymeric material having incorporated therein a UV-light absorber.

20 Claims, No Drawings

PLANT PROTECTION

FIELD OF THE INVENTION

The present invention is generally in the field of agriculture or horticulture and provides a method and construction, for protecting plants and their crops against insect infestation. The term "insect infection" as used herein means to denote direct insect infection of plants, e.g. by insects or their larva feeding on the plants or their crops, as well as indirect infection, as a result of disease causing microorganisms, e.g. viruses, for which the insects serve as an infection vector.

BACKGROUND OF THE INVENTION AND PRIOR ART

Infection of plants or their crops by insects, is a major concern in both agriculture and horticulture. There are a variety of means of combating such infection, such as by the use of insecticides, by the use of insect traps, by protecting nets and others.

In recent years there has been a growing popularity, particularly in intensive farming, to grow plants within netted enclosures, namely enclosures where the walls are made or consist of nets. Such nets have the advantage that they allow ventilation, block strong winds to a certain extent and prevent entry of insects. However, no such enclosure can be made entirely hermetic, as tears or gaps in the netting occasionally occur. Furthermore every such enclosure needs to have an entry for individuals, and insects can then penetrate therethrough when the entry is opened.

Once an insect penetrates into such enclosure, it has a capacity of infecting the plants or their crop. This is primarily a concern in the case of insects with a short life cycle, in which case the entire life cycle can be rapidly completed within the enclosure, yielding a large number of offsprings, which can again infect the plants, and so forth.

GENERAL DESCRIPTION OF THE INVENTION

The present invention is based on use of nets which are made of a transparent or translucent polymeric material in which there is a substance incorporated which absorbs UV light (UV-light absorber). It was found in accordance with the invention that use of such nets in enclosures made of or comprising such nets, yields a more effective protection of plants or their crops grown in such enclosures as compared to use of conventional nets which do not incorporate a UV-light absorber In the following, the term "plant protection" or "protection of plants" will be used to denote protection of plants or their crops from insect infection. The term "netted greenhouse" will be used to denote an area having at least a roof which is made of or having at least a substantial portion which is made of a net. In addition to its roof, a netted greenhouse may comprise also side walls made of or having at least a portion made of a net.

The term "substantial portion" denotes such a portion of the walls or roof which is dominant in defining the features and properties of the roof or walls. A substantial portion in this context is such a portion which is sufficient to ensure adequate ventilation of the plants, e.g. a portion comprising at least 40% of the entire surface of the walls or roof, preferably at least 50%, most preferably at least 70% and desirably above 80% of the entire surface of the roof or side walls.

In accordance with one of its aspects, the present invention provides a method for protection of plants or their crops from insects' infection, comprising growing the plants under a construction having a roof with at least a substantial portion being made of a net of a mesh size allowing adequate ventilation, the net being made of a transparent or translucent polymeric material having incorporated therein a UV-light absorber.

In accordance with another aspect, the present invention provides an enclosure for growing plants comprising a roof having at least a substantial portion made of a net of a mesh size allowing adequate ventilation, the net being made of a transparent or translucent plastic material, wherein there is incorporated a UV-light absorber.

The construction may be a permanent construction, or may be a temporary construction erected over the plants or over an area intended for cultivation of the plants. The construction may be erected similarly as known in the art of netted greenhouses.

The requirement for a roof where at least a substantial portion is made of a net with the above specification, is a minimum requirement in accordance with the invention. Even in cases where the construction comprises only a roof, without side walls (namely the construction being open at its sides), the fact of having a netting with the above specification, provides a relatively high degree of protection against insect infection. Preferably, however, the construction has also side walls, preferably side walls where a substantial portion is made of a net with the above specifications.

In accordance with a further aspect, there is also provided a net for use in the above method and construction. Such a net will be referred to herein as "inventive net".

The inventive net can be made with a mesh size larger than that required for physical prevention of entry of the insects through the net. As will be appreciated, however, the mesh size of the net in a netted greenhouse is preferably, although not necessarily, sufficiently small to prevent entry of insects through the net.

The mechanism of action of the net of the invention in prevention or reduction of insect infection is not clear, although, and without having to be bound by theory, it is believed that this is as result of a change of the light spectrum reaching the plants and consequently the manner in which the plants appear to the eyes of the insects.

The net may, for example, have openings of a mesh from about 4/cm, preferably from about 12/cm to about 30/cm, preferably to about 25/cm a mesh of about 20 per centimeter being particularly preferred. The openings may be squares or may be rectangles. In the latter case, the openings may have a mesh size in one direction from about 6/cm, preferably from about 12/cm to about 30/cm, preferably to about 25/cm with about 20 per centimeter being particularly preferred; and in the other direction from about 4/cm, preferably from about 8/cm to about 25/cm, preferably to about 12/cm with about 10 per centimeter being particularly preferred.

DETAILED DESCRIPTION OF THE INVENTION

The present invention makes use of a net made of a transparent or translucent polymeric material, with incorporated UV-light absorber.

Examples of polymeric materials which can be used in such nets are polyvinyl, polyethylene, polyester, polypropylene, high-density polyethylene.

An example of UV-light absorbers is benzotriazole.

The UV-light absorber should be present in an amount sufficient to absorb a substantial portion of the UV-light radiation. Typically, it will be in an amount such that it filters out about more than 60%, preferably more than 70%, and desirably more than about 90% of the UV-light from the solar radiation which impinges on the polymeric material.

For example, the UV-light absorber may be present in the polymeric material in a concentration range from about 0.1% (w/w) preferably from about 0–2% (w/w) to about 2% (with preferably to about 1% (w/w).

In experiments conducted in accordance with the invention, a variety of nets were used which had a mesh of about 8 to about 24 per centimeter in one direction, and about 4 to about 12 in the other direction with filaments in the range of 0.15 to about 0.35 mm.

The UV-light absorber which was used was benzotriazole, at a concentration of about 0.4% w/w.

Experiments were carried out with such nets in various crops. In the experiments netted greenhouses with walls and roof were made of nets with the above specifications were constructed and the level of insect infestation was determined. This was compared to the level of infestation in netted greenhouses, under similar conditions, where the nets were conventional nets.

It was found that when the inventive nets were used, only about 5% of the plants showed signs of damage inflicted by the insects, whereas in controlled experiments about 30% or more of the plants showed signs of damage inflicted by the insects.

What is claimed is:

1. A method for protection of plants or their crops from infection by insects, comprising:
   disposing a net of a mesh size allowing adequate ventilation in operative relationship to at least some of said plants and at least partially between said plants and a source of UV light;
   wherein the net comprises a transparent or translucent polymeric material having incorporated therewith a sufficient amount of UV-light absorbent material to cause at least about 60% of the incident UV light to be filtered out;
   providing at least one area that would permit said insects to have physical access to said plants;
   filtering out at least about 60% of the UV light that, except for said net, would have been incident on said plants as a consequence of the UV light absorbent material incorporated with said polymeric material, such that at least about 60% of the incident UV light is prevented from reaching an area around said plants;
   at least reducing the number of infecting insects passing from said ambient atmosphere to said plants as a consequence of filtering out said UV light; and
   thereby at least reducing the amount of infection of said plants or crops caused by said insects.

2. The method according to claim 1, wherein said UV light absorber is incorporated with the polymeric material in a concentration range from about 0.1% (w/w) to about 2% (w/w).

3. The method according to claim 1, wherein said UV-light absorber is incorporated with the polymeric material in a concentration range from about 0.2% (w/w) to about 1% (w/w).

4. The method of claim 1, further comprising the step of leaving at least one side of the structure, between a roof of said structure and the ground, open.

5. The method of claim 1, wherein further comprising providing a net having a mesh size that is sufficiently large to allow physical passage of the insects there through.

6. An enclosure for growing plants comprising:
   a roof;
   at least one side wall operatively associated with said roof; and
   at least one net, having a mesh size allowing adequate ventilation of said plants, disposed about said plants including on at least part of said roof;
   wherein the net comprises a transparent or translucent polymeric material
   having incorporated therewith an amount of UV-light absorber sufficient to enable exclusion of at least about 60% of UV light incident on said net from passing through said net;
   wherein said enclosure comprises at least one area that poses no physical impediment to the passage of insects into proximity to said plants; and
   wherein the exclusion of said UV light at least reduces the number of plant infecting insects that will pass into said enclosure.

7. An enclosure according to claim 6, wherein said net comprises at least a substantial portion of both the roof and wall(s) of said enclosure.

8. The enclosure according to claim 6, wherein said UV-light absorber comprises benzotriazole.

9. The enclosure according to claim 6, wherein said UV-light is contained in solar radiation which impinges on the enclosure.

10. The enclosure according to claim 6, wherein the amount of said UV-light absorber that is present is sufficient to cause more than about 90% of the UV-light which impinges on the enclosure to be excluded from passing through said net.

11. The enclosure according to claim 6, wherein said UV-light absorber is incorporated with the polymeric material in a concentration range of about 0.1% (w/w) to about 2% (w/w).

12. The enclosure according to claim 6, wherein said UV-light absorber is incorporated with the polymeric material in a concentration range of about 0.2% (w/w) to about 1% (w/w).

13. The enclosure according to claim 6, wherein said net has a mesh size that is in the range of about 4 openings per centimeter to about 30 openings per centimeter in a first direction.

14. The enclosure to claim 6, wherein said net has a mesh size that is in the range of about 20 openings per centimeter to about 25 openings per centimeter in a first direction.

15. The enclosure according to claim 6, wherein said net comprises at least about 40% of a roof of said enclosure.

16. The enclosure according to claim 6, wherein said net comprises at least about 80% of the a roof of said enclosure.

17. The enclosure of claim 6, wherein at least one side of said enclosure between a roof and the ground is left open that whereby a side of said enclosure is free of said net.

18. The enclosure of claim 6, wherein the mesh size of the net is sufficiently large to allow physical passage of the insects there through.

19. A net, having a mesh size that is sufficiently large to allow ventilation there through, wherein said net comprises a transparent or translucent polymeric material, having incorporated with said polymeric material a sufficient amount of a UV-light absorber to prevent at least about 60% of incident UV light from passing through said net and, as a consequence of exclusion of said UV light, is adapted to prevent the transmission there through of insects that are able to cause infestation of plants.

20. The net of claim 19 having a mesh size that is sufficiently large to allow physical passage of insects there through.

* * * * *